United States Patent [19]
Ty et al.

[11] 3,769,487
[45] Oct. 30, 1973

[54] METHOD FOR WELDING MANGANESE ALLOYS

[75] Inventors: Henry Ty, Attleboro, Mass.; John Baptista, Pawtucket, R.I.

[73] Assignee: Texas Instruments Incorporated, Dallas, Tex.

[22] Filed: Oct. 27, 1971

[21] Appl. No.: 193,050

[52] U.S. Cl.................. 219/104, 29/504, 219/118
[51] Int. Cl............................................. B23k 11/20
[58] Field of Search.................. 219/104, 117, 118; 29/504, 196.4

[56] References Cited
UNITED STATES PATENTS
2,790,656  4/1957  Cook ............................ 219/118 X Primary Examiner—R. F. Staubly
Assistant Examiner—B. A. Reynolds
Attorney—Harold Levine

[57] ABSTRACT

A method for welding alloys of high manganese content to avoid the development of weld flash is shown to comprise the steps of resistance welding the manganese alloy under conditions of temperature and pressure which are adequate for forcibly expelling manganese oxide from the surface of the alloy. The resistance welding is performed while a thin layer of tin is disposed at the weld location, the tin being melted but remaining fluid without significant vaporization thereof at the welding temperature for restraining expelled manganese oxide at the extremities of the weld location to prevent the formation of weld flash.

7 Claims, 3 Drawing Figures

METHOD FOR WELDING MANGANESE ALLOYS

In manufacturing electrical circuit breakers and the like using thermostat metal elements which have a layer of manganese alloy characterized by a very high coefficient of thermal expansion, it is frequently necessary for economy in the manufacturing process to weld the manganese alloy layer of the thermostat metal to a suitable support or other member. However, because such manganese alloys are characterized by inherent manganese oxide surface films which tend to deter weld formation, it has become conventional to create such welds by the resistance welding technique with the welding currents and pressures being selected so that manganese oxide is forcibly expelled from the surface of the manganese alloy at the weld location. In this way, it has been found that a secure and reliable weld is formed between the manganese alloy and the associated support. Unfortunately, use of this welding technique has resulted in creation of excessive weld flash which is quite stringy in nature. This weld flash, besides being unsightly, is sometimes quite loose so that there is risk of the flash becoming separated during use of the circuit breaker to cause electrical shorting. On the other hand, the flash is sometimes very strongly adherent to the thermostat metal or the support so that cleaning of weld to remove the weld flash is not easily accomplished.

It is an object of this invention to provide a novel and improved method for welding manganese alloys; to provide such a method which achieves secure and reliable welds; to provide such a method which creates such welds while substantially avoiding development of weld flash; to provide such a method which is readily performed using conventional welding equipment; and to provide such a method which is economical to perform.

Other objects, advantages and details of the method of this invention appear in the following detailed description of preferred embodiments of the invention, the detailed description referring to the drawings in which.

Figure 1:
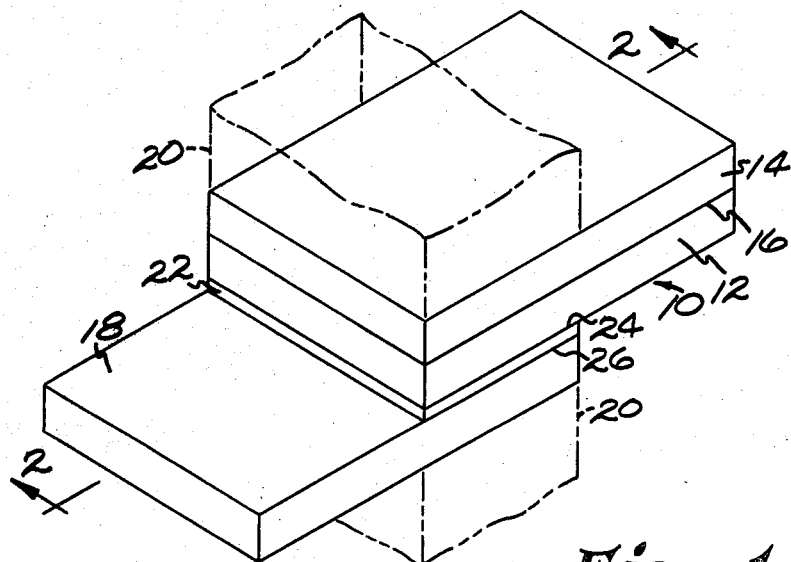
FIG. 1 is a perspective view of a weld being formed in accordance with the method of this invention.
Figure 2:
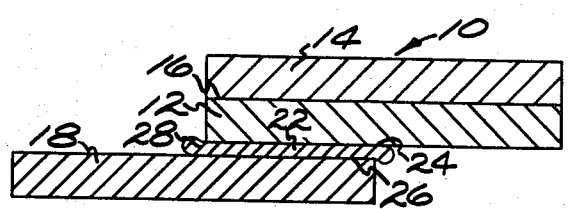
FIG. 2 is a partial section view, to enlarged scale, along line 2—2 of FIG. 1.

Referring to the drawing, 10 in FIGS. 1 and 2 indicates a thermostat metal element having a layer 12 which is formed of a manganese alloy and having a layer 14 which is formed of a metal of sunstantially different coefficient of thermal expansion, the metal layers being metallurgically bonded together throughout the interface 16 between the layers in conventional manner. In FIG. 1, the element 10 is illustrated as being resistance welded to a metal support 18 by use of conventional resistance welding means diagrammatically illustrated by the welding electrodes 20 indicated in broken lines. As will be understood such thermostat metal elements are conventionally welded to such supports in electrical circuit breaker devices, thermostats and the like, the thermostat metal element being adapted to flex to a selected extent in response to a selected temperature change for actuating the device or for performing some other control function. In this regard, the thermostat metal element is shown as a simple bimetal leaf and the support is shown in a simple member to illustrate the welding method of this invention but the multilayer thermostat metal element could have more than two layers and could be dished or provided with another configuration within the scope of this invention. The support or other member 18 could also be of another configuration, the important characteristics of the element and support as illustrated being that the element has a surface layer portion, at least, formed of a manganese alloy and that the support or other member to be welded to the manganese alloy is formed of metal. In this regard, the term "manganese alloy" is considered to apply to any alloy having a sufficiently high manganese content to be characterized by the presence of an inherent surface film of manganese oxide in air at room temperature, such alloys including most alloys having a manganese content greater than about 25 percent by weight of the alloy.

In accordance with the method of this invention, a thin layer 22 of tin is disposed between the manganese alloy layer 12 of the thermostat metal element 10 and the support 18 to preferably cover the surface areas of the element and support at the location where the weld is to be formed. The electrodes 20 of the conventional resistance welding apparatus are then pressed together in conventional manner to apply a selected compressive force to the element 10, to the support 18 and to the layer 22 of tin disposed between the element and support. At the same time, a selected electrical current is directed from one of the electrodes 20 to the other electrode 20 through the portions of the element, support and layer of tin which are compressed between the electrodes. In accordance with this invention, the electrical current directed between the electrodes is selected with reference to the compressive force applied by the electrodes and with respect to area of the element and support being compressed by the electrodes so that the temperature established at the interface 24 between the layer 12 of the thermostat metal element and the layer 22 of tin is above the melting temperature of tin and is sufficiently high to soften the manganese alloy of the layer 12 and to soften the surface film of manganese oxide on the layer 12 to the point where the compressive force applied to the thermostat metal element and the support is effective to squeeze and forcibly expel manganese oxide from the surface of the layer 12 to expose the manganese alloy beneath the film. As will be understood this force will also be effective to move the expelled manganese oxide material in the direction of the edges or extremities of the area between the element and support which is compressed by the electrodes 20. Of course, the selected current directed between the electrodes 20 is also adapted to heat the surface of the support 18 at the interface 26 between the support and the layer 22 of tin to a welding temperature of the support material. In this way, it is found that the layer of tin material is liquefied and is worked into the grain boundaries of the manganese alloy and that the manganese alloy of the element layer 12 is securely welded to the support 18 throughout a substantial portion of the areas defined by the interfaces 24 and 26 to form a welded assembly. At the same time, most of the liquefied tin material is forced toward the edges or extremities of the area defined by the interfaces 24 and 26 but, because of the high vaporization temperature of tin, there is little tendency for the tin material to vaporize. The tin therefore accumulates at the extremities of the weld formed between the element and support as indicated at 28 in FIG. 2, thereby to restrain expulsion of the manganese oxide material from the area defined by the interfaces 24 and 26 and to effectively prevent the formation of any significant weld flash at the extremities of the weld. In this way, the method of this invention, produces a secure and reliable weld between the manganese alloy of the layer 12 and the support 18 while avoiding development of any weld flash which could become separated from the weld area or which would require cleaning or removal from the weld area.

For example, in a preferred embodiment of the method of this invention, the thermostat metal element 10 embodies a layer 12 of a manganese alloy having a nominal composition, by weight, of 72 percent manganese, 18 percent copper and 10 percent nickel, a material conventionally enployed in thermostat metals to display a relatively high coefficient of thermal expansion. The element also embodies a layer 14 of Invar having a nominal composition, by weight, of 36 percent nickel and 64 percent iron, this conventional thermostat metal material displaying a relatively low coefficient of thermal expansion. These metal materials are bonded together throughout the interface 16 in any conventional manner. The element 10 preferably has a total thickness on the order of 0.012 inches with the layers 12 and 14 being of equal thickness and preferably has a width of about 0.250 inches. The area of the element which is engaged by the electrode 20 is typically about 0.250 inches on the side. The support 18 preferably has a thickness of about 0.035 inches and preferably embodies a low carbon steel or other ferrous alloy, a copper alloy or material such as oxygen-free high conductivity (OFHC) copper, another manganese alloy or the like. Preferably, for example, the support 18 is formed of SAE 1010 low carbon steel having a nominal composition, by weight, of 0.08 to 0.13 percent carbon, 0.30 to 0.60 percent manganese, 0.040 percent (maximum) phosphorous, 0.050 percent (maximum) silicon, and the balance iron. The tin layer 22 preferably has a thickness in the range from about 0.000050 to about 0.005 inches and desirably has a thickness of about 0.0005 inches, the layer preferably embodying commercially pure tin material having a melting temperature of about 1,100°F. and having a vaporization temperature of well over 3,000°F.

In accordance with the method of this invention, the electrodes 20 are arranged to apply a compressive force typically of about 400 pounds per square inch, to the thermostat metal element 10 and to the support 18 and a direct current 40 amperes at 440 volts is directed between the electrodes 20 for approximately 1 to 5 sixtieths of a second. In this way a temperature of at least about 1,100°F. and typically of about 1,900°F. is developed at the interfaces 24 and 26 sufficient to liquefy the tin material on the layer 22, sufficient to soften the manganese oxide surface film on the layer 12 so that the manganese oxide is expelled from the surface of the layer 12 and is moved to the extremities of the 0.250 inch square weld area, and sufficient to permit secure welding of the manganese alloy of layer 12 to the support 18 throughout a substantial portion of the weld area. Tin material is found to extend into the manganese alloy to surround the grain boundaries of the alloy at least at the surface portion of the layer 12 and is also found to be accumulated at the extremities of the weld area as indicated at 28 in FIG. 2 where the manganese oxide expelled from the layer 12 is also found to be restrained by the tin material. The expelled manganese oxide is thus effectively retained at the extremities of the weld without tending to form an unsightly weld flash on the element or on the support around the weld. Further, there is no tendency for any loose manganese oxide or other metal material to be expelled from the weld area and there is therefore no need to attempt to remove such loose manganese oxide from the weld area or any other part of the element or support. The weld formed between the layer 12 of the thermostat metal element and the support 12 is very strong and reliable and is equal or superior in strength to resistance welds formed between manganese alloys and the support materials be methods previously used in the art.

Figure 3:
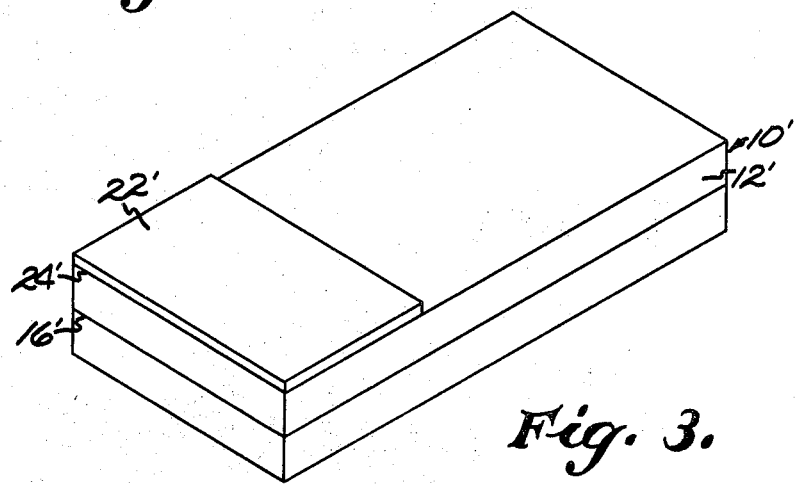
FIG. 3 is a perspective view illustrating an alternate embodiment of this invention.

As will be understood, the method as above-described can be modified in various ways within the scope of this invention, the essential features of the method being that the resistance welding temperatures and pressures utilized are adequate to cause forcible expulsion of manganese oxide from the surface of the manganese alloy being welded and that a material such as tin which melts at the welding temperature but which is not significantly vaporized at the welding temperature is disposed in the weld area to restrain expulsion of such manganese oxide beyond the extremities of the weld. In this regard, it will be noted that the layer of tin foil shown in the drawings as being separate and discrete from the thermostatic element and support, need not be separate in performing the method of this invention. For example, the layer of tin can desirably be bonded to the surface of the support 18 by electroplating, spraying, dipping, roll-bonding or the like in any conventional way, whereby, when a selected surface area of the manganese alloy element is abutted against the coated support or, the tin material is disposed at the area to be welded in the manner above-described. Similarly, a layer of tin material could be secured to the back of an electrical contact member so that, when the tin contact layer is abutted with a manganese alloy surface layer of a thermostat metal element, the tin material is disposed at the area which is to be welded in welding the contact to the thermostat metal element by the method of this invention. Of course, the tin material could also be secured to a selected surface area of the manganese alloy layer of the thermostat metal element within the scope of this invention. In fact, this invention is intended to include provision of a thermostatic element such as the element 10' shown in FIG. 3 having one outer surface thereof formed of a layer 12' of a manganese alloy as above-described and having a selected area of said outer surface having a layer 22' of tin secured to said surface.

It will be understood that this invention includes all modifications and equivalents of the preferred inventive embodiments above-described which fall within the scope of the appended claims.

We claim:

1. A method for welding alloys of high manganese content to avoid the development of weld flash, said method comprising the steps of forming a resistance weld between a member and a manganese alloy material having a manganese oxide film thereon at a welding temperature and pressure which forcibly expels said manganese oxide from said material at the location of said weld while disposing a selected metal material which is meltable at said welding temperature and which has a vaporization temperature above said welding temperature at said location of said weld for liquefying said selected material during said welding to restrain said expelled manganese oxide at the extremities of said weld.

2. A method as set forth in claim 1 wherein said selected material comprises tin.

3. A method as set forth in claim 2 wherein said manganese alloy material is welded to a metal material selected from the group consisting of copper alloys, ferrous alloys and manganese alloys.

4. A method as set forth in claim 3 wherein said welding temperature is at least about 1,100°F.

5. A method as set forth in claim 4 wherein said tin material comprises a layer of tin disposed between said manganese alloy material and said material to which said manganese alloy material is to be welded, said layer of tin having a thickness in the range from about 0.000050 to 0.010 inches.

6. A method as set forth in claim 5 wherein said manganese alloy material has a nominal composition, by weight, of about 72 percent manganese, 18 percent copper and 10 percent nickel.

7. A method for welding a multilayer thermostat metal element to a metal member while avoiding the development of weld flash, said thermostat metal element having an outer surface layer of a manganese alloy having a nominal composition, by weight, of about 72 percent manganese, 18 percent copper and 10 percent nickel and having a surface film of manganese oxide thereon, said method comprising the steps of disposing a layer of tin between a portion of siad outer surface layer of said thermostat metal element and a surface portion of a metal member formed of a material selected from the group consisting of copper alloys, ferrous alloys, and manganese alloys, compressing said thermostat metal element, said layer of tin, and said metal member together while directing electrical current therethrough for heating said surface portions of said element and member to a welding temperature of at least about 1,100°F. to forcibly expel manganese oxide from said outer surface of said thermostat metal element, and to liquefy said layer of tin, thereby to form a weld between said outer surface of said thermostat metal element and said metal member and to restrain said expelled manganese oxide at the extremities of said weld.

* * * * *